United States Patent [19]
Kuhn

[11] 3,923,197
[45] Dec. 2, 1975

[54] GASKET ASSEMBLY FOR ENCLOSED ELECTRICAL APPARATUS

[75] Inventor: Edmund W. Kuhn, Pittsburgh, Pa.

[73] Assignee: Westinghouse Electric Corporation, Pittsburgh, Pa.

[22] Filed: Jan. 30, 1974

[21] Appl. No.: 438,059

[52] U.S. Cl. .............................. 220/344; 277/226
[51] Int. Cl.² ......................................... B65D 53/00
[58] Field of Search ........... 220/228, 232, 310, 322, 220/344, 354, 355, 356, 357, 358, 378; 277/226

[56] References Cited
UNITED STATES PATENTS

| | | | |
|---|---|---|---|
| 1,281,922 | 10/1918 | Fairbanks | 220/344 |
| 1,356,085 | 10/1920 | Ottem | 220/355 |
| 1,506,596 | 8/1924 | McMurdie | 220/344 |
| 2,848,782 | 8/1958 | Gillison | 220/344 |
| 2,974,079 | 3/1961 | Korotkevich | 277/226 |
| 3,168,960 | 2/1965 | Dean | 220/344 |
| 3,310,329 | 3/1967 | Luker | 220/344 |
| 3,411,660 | 11/1968 | Lafarge | 220/357 |
| 3,666,134 | 5/1972 | Rauch | 220/344 |

*Primary Examiner*—William I. Price
*Assistant Examiner*—Ro E. Hart
*Attorney, Agent, or Firm*—M. J. Moran

[57] ABSTRACT

A picture frame gasket channel and cooperating resilient picture frame gasket member where the picture frame gasket channel is welded onto the cover of an enclosure for electrical equipment. The equipment is contained within a suitable container having an edge which contacts a flat portion on the picture frame gasket member to compress the gasket against the inner surface of the channel to thus provide a fluid tight enclosure for electrical equipment.

5 Claims, 8 Drawing Figures

GASKET ASSEMBLY FOR ENCLOSED ELECTRICAL APPARATUS

BACKGROUND OF THE INVENTION

This invention relates generally to gaskets and in particular to compression gaskets. It is known in the prior art to provide gaskets between the cover and the container for electrical equipment such as electrical network protecting equipment. The reasons for this is that the network protecting equipment may be disposed in underground vaults where water or moisture may be present and which could if allowed to seep into the enclosed network protection equipment or electrical apparatus cause detrimental affects. In the prior art the gasket usually comprises a stainless steel or similar inner flange welded separately to the lid of the enclosure and a separate and distinct similar stainless steel outer flange welded separately to the outer surface of the lid of the container. A generally annular neoprene rubber resilient gasket is placed between the two flanges around the entire periphery of the lid of the enclosure. The flange edges are then bent over to entrap or affix the generally annular circular rubber member therein. However, a spacing is provided between the two edges of the bent over stainless steel tips to allow the lid to be compressed against edges in a complementary container. The compression between the outer edge of the container and the door causes the neoprene or rubber gasket to compress providing an effective seal. It would be advantageous to provide a gasket for a container comprising a preconstructed frame or channel into which a preconstructed gasket is disposed after the channel had been welded onto the lid. This means that the gasket material, the channel and the lid may be fabricated independently. It would also be advantageous to provide a gasket sealing means where the gasket would not easily roll away or roll off of the complementary edge upon which it is disposed thus weakening the seal.

SUMMARY OF THE INVENTION

In accordance with the invention a gasket member is provided which includes a picture frame channel, that is a channel which has a characteristic U-shape in cross-section but which is peripherally contiguous on the lid, that is it closes upon itself having no open gaps. The contiguous picture frame may be circular, square, rectangular or of any other convenient shape. A contiguous rubber gasket is provided for being disposed within the last mentioned channel after the channel has been welded or otherwise affixed to a lid or similar member of an enclosure or container. The corners of the contiguous gasket material are molded into the ends of the side pieces of the gasket material to provide a contiguous or continuous gasket. The gasket material has a planar surface against which the mating surface of the container to which the lid is to be attached in a fluid type arrangement is disposed. In a preferred embodiment of the invention the container or enclosure which includes the novel gasket arrangement protects or encloses network protection equipment.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENTS

Figure 1:
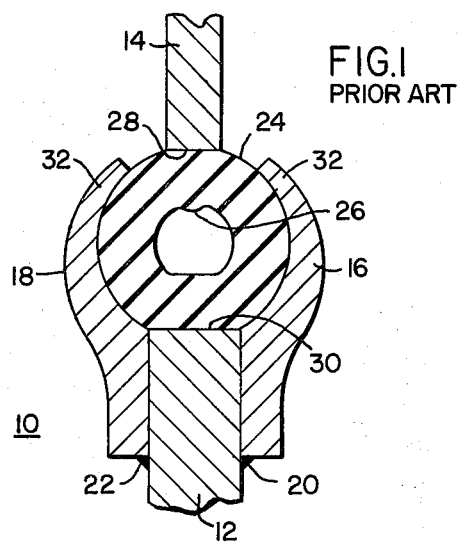
FIG. 1 shows a partially broken away sectional elevation of a prior art gasket.

Referring now to the drawings and FIG. 1 in particular, a prior art channel assembly is shown in elevated, cross-section. A structural member 12 having an upper edge or surface 30 is shown. Member 12 has welded thereto an inner and outer flange member 16 and 18 respectively at 20 and 22 respectively. A gasket member 24 which is generally annular and circular in cross-section is disposed within the bite portion formed by the tips 32 of the flange members 16 and 18. A complementary structural member 14 having a surface 28 is disposed in sealed relationship against the gasket 24 to provide a seal at surface 28 and to provide another seal at surface 30. The annular gasket material 24 has an inner hole 26 which may distort to allow compression of the gasket member 24 by the portions or members 14 and 12 as they are disposed close to each other in sealed relationship.

Figure 1A:
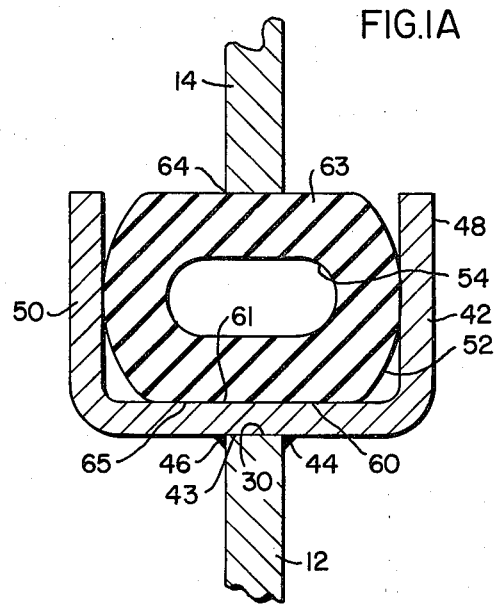
FIG. 1a shows a partially broken sectional elevation of the novel gasket assembly.

Referring to FIG. 1a, a novel gasket assembly is shown. Once again the complementary structural members 12 and 14 are present. However, member 12 has welded thereto at points 44 and 46 a U-shaped channel member 42 having oppositely disposed spaced side members 48 and 50 and a bottom portion 51 having an inner surface 61 and an outer surface 43. The U-shaped channel member 42 is securely and fluid tightly welded on the top edge or surface 30 of member 12 at the outer surface 43 of the bottom portion 51 of the member 42. The welds are shown at 44 and 46. An annular gasket member 52, having a central opening 54 with upper and lower planar surfaces 63 and 60 respectively is place in intimate sealed relationship at lower planar surface 60 with inner surface 61 of the bottom portion 51 of the U-shaped channel member 42 and is disposed thereto in one embodiment with cementing material or cement 60. The edge or surface 28 of the upper member 14 resets stably against the planar surface 63 of the resilient member 52 when the sealed relationship has been completed. This occurs when member 14 is forced, such as by gravity, toward the member 12 to compress member 52 therebetween.

Figure 2:
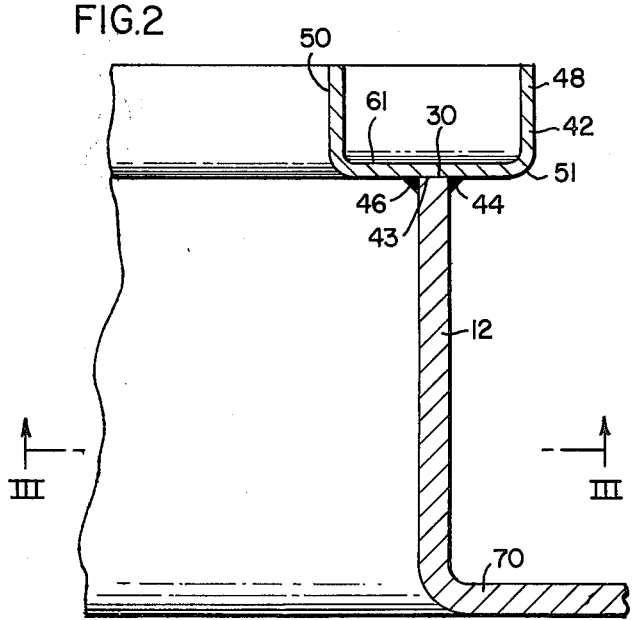
FIG. 2 shows a partially broken away side elevation of a channel and lid assembly.

Referring now to FIG. 2 a view of a channel member 48 disposed on lower member 12 which may be part of an equipment cover 70 is shown. The side pieces 48 and 50 and the bottom piece 51 of the channel are discernible. The welds 44 and 46 are also discernible as is the inner and outer surfaces 61 and 43 respectively of the bottom member 51. It is to be noted that is the outer surface 43 which abuts the top edge of the member 12 and which is secured thereto by the fluid proof or fluid sealing welds 46 and 44.

Figure 3:
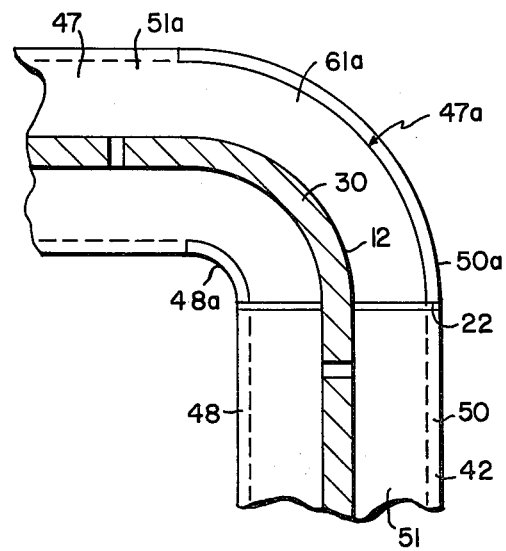
FIG. 3 shows a corner section of a channel.

Referring now to FIG. 3 a corner section of channel member 47 is shown. The corner section comprises a portion of the elongated channel member 47 and a corner portion 47a. The corner portion 47a is seamless and comprises an extended elongated portion 47 as an integral part thereof. The top edge portion 30 of member 12 is shown, it being noted that member 12 is bent at an angle of approximately 90°. The side sections 48 and 50 of the channel member 42 are shown and the inner surface 61 of the bottom portion 51 is also shown. The corner portion 47a comprises an inner side 48a and an outer side 50a which are separately formed and then welded to member 47a. Inner surface 61a of bottom portion 51a is also shown. The corner portion 47a is abutted and securely affixed to the elongated member 42 at the welded joint 22. It is to be noted that the corner portion is essentially seamless on the inner surface 61a.

Figure 4:
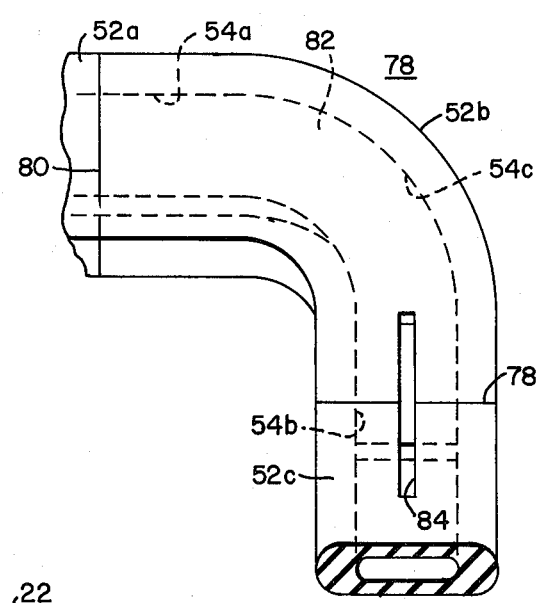
FIG. 4 shows a corner section of gasket material.

Referring now to FIG. 4, the gasket material shown there comprises elongated gasket portions such as 52a and 52c oriented at right angles with respect to each other and vulcanized to a corner portion 52b which in turn is made by molding neoprene rubber in a mold. The vulcanized joints 78 and 80 respectively are formed in the molding process against the ends of the elongated sections 52a and 52b respectively. The inner channels 54a, 54b and 54c are continuous as well as the molded outer gasket members 52a, 52b and 52c. In the molding process a curved molding form 82 may be used. The previously described molding form 82 is removable through slit 84 in a portion of the member 52c. It will be noted that the seams 78 and 80 are vulcanized thus providing for a corner 78 which is contiguous.

Figure 5:
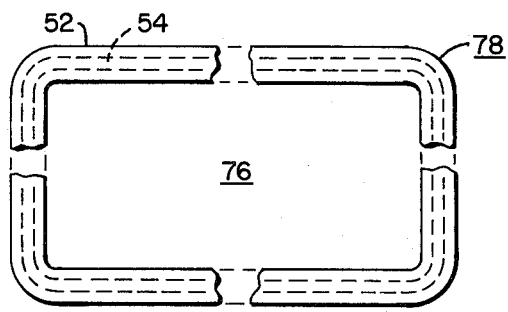
FIG. 5 shows a picture frame of contiguous gasket material.

Referring now to FIG. 5 a "picture frame" arrangement of the gasket material shown in FIG. 4 is depicted. This picture frame arrangement is designated 76. The integral vulcanized molded rubber corner piece 78 is also shown. The picture frame material is contiguous and in the shape of a rectangle and is indpendently made from any other portion of the gasket assembly. The picture frame gasket 76 comprises annular material 52 having a central opening 54. The central opening 54 is contiguous as is the gasket material 52. The corner portions are formed by injection molding and the side portions are predominantly formed by extrusion. The component parts are vulcanized together. As a result, different sized picture frames of gasket material cna be formed using the same process equipment as the corners are always the same size and the side pieces are cut to fit.

Figure 6:
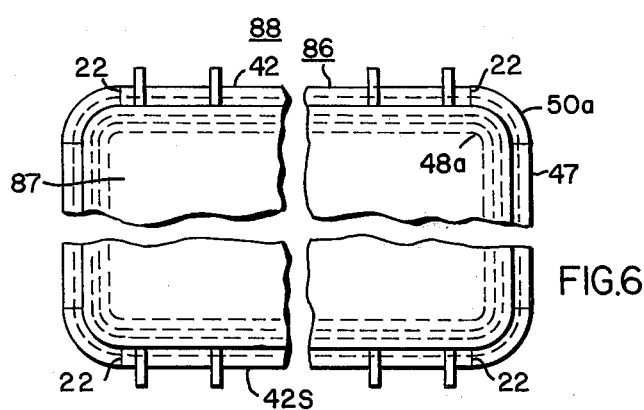
FIG. 6 shows a picture frame of continuous channel material on the lid of a network protector.

Referring now to FIG. 6 a contiguous picture frame of the channel 42 is shown. This continuous or contiguous picture frame is generally designated 86. It will be noted that the welds are at 22 near the four corners and it will also be noted that the four corners are generally seamless and that members 47 which comprise the ends of the channels are generally of one-piece construction (excpet for pieces 48a and 50a) and are welded to the intermediate side sections, designated 42s, at the welded joints 22. Picture frame 86, in this embodiment of the invention, represents a portion of a lid 87 for a network protector enclosure 88.

Figure 7:
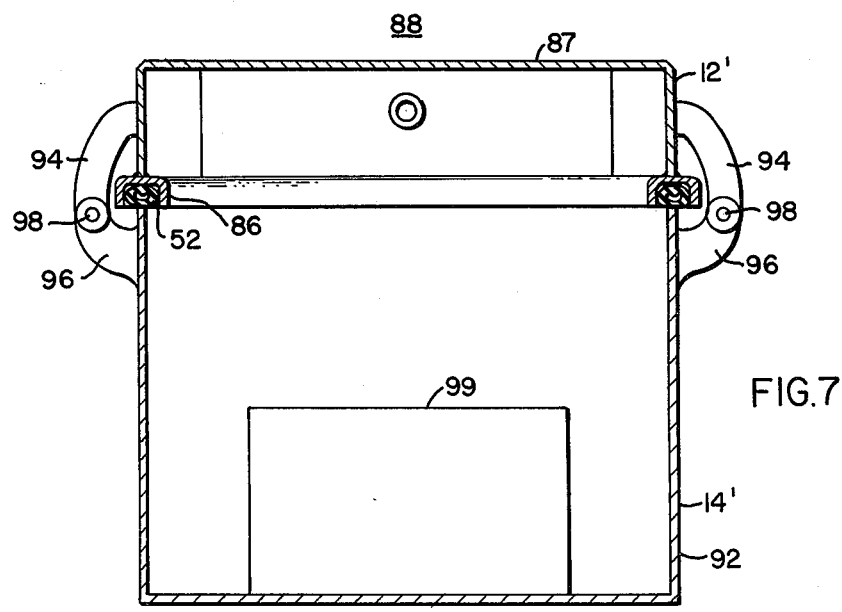
FIG. 7 shows a side elevation partially in functional form of a network protector using the lid of FIG. 6.

Referring to FIG. 7 a side cut-away view of the network protector enclosure 88 is shown. The lid 87 is shown disposed upon the bottom portion or container member 92. There are provided hinge members 94 on the lid member 87 and complementary hinge members 96 on the container member 92. A bolt or axle member 98 is provided to interconnect the hinge members 94 and 96 in each case. The unitary contiguous picture frame channel 86 is depicted having a uniform contiguous picture frame gasket member 52 disposed therein. It can be seen that the interaction of the hinge members 94 and 96 and the bolt members 98 assist in maintaining compression of the member 52 between the wall 12' of the lid portion 87 and the wall 14' of the container portion 92 to thereby provide a sealed enclosure. Shown within the enclosure 88 is a functional representation of a network protector circuit 99.

Referring once again to FIG. 1a, the embodiment shown therein may comprise an enclosure for a network protector such as shown in FIGS. 6 and 7. Member 14 may comprise a tank wall and member 12 may comprise a door for the netword protector enclosure. Member 42 may comprise a stainless steel retainer or a U-shaped channel. The sealing of surface 60 may be cementing and the sealing of surface 64 may be by pressure contact between element 12 and 14.

It is to be understood with respect to the invention that member 12 may be designated a first member and member 14 may be designated a second member. It is also to be understood that members 12 and 14 have edge portions. It is also to be understood that when the designation "picture frame channel member" is used in the claims, that indicates a channel member which is in the distinctive characteristic shape of a rectangle or square or circle or any other contiguous member which is closed upon itself providing an area enclosed by the contiguous or continuous channel. It is also to be understood that the designation "seamless corner" in the claims means that the portion 61 of the corner is generally seamless but does not necessarily mean that the joints designated at 22 are not present nor does it generally mean that side portions for the inner surface 61 may not have seams caused by welding the side portions 48a and 50a to the bottom 51a. It is to be understood that the characteristic U-shape of the channel 42 is not limiting. It is also to be understood that the preferred embodiment of the invention for use in a network protection assembly is not limiting. It is also to be understood that the central opening 54 is the gasket member 52 is not limiting and that in some of the embodiments of the invention need not even be present. It is also to be understood that the flat surfaces 63 and 65 for the gasket member 52 need not both be present in all embodiments of the invention. It is also to be understood that the gasket member 52 may comprise neoprene rubber or similar resilient gasket material. It is also to be understood that the material which comprises the channel member 42 is not limiting and may comprise stainless steel or any other similar structural material. It is also to be understood that the welds at 46 and 44 are not limiting and that other fluid type welds may be provided if they are generally fluid tight.

The apparatus embodying the teachings of this invention have many advantages one of which lies in the fact that the channel, the member to which the channel is to be attached, and the gasket material may be fabricated independent of each other, and brought together at one time in the fabricating process. Another advantage lies in the fact that a memner such as 14 shown in FIG. 1a cannot easily roll one way or another with respect to the gasket material 52 because of the presence of the flat surface 63. Another advantage lies in the fact that the described gasket arrangements provide larger sealing surfaces such as indicated at the surfaces 65 and 61 on the bottom of the gasket material 52 and the surfaces 64 and 63 on the upper portion of the gasket material 52. Another advantage lies in the fact that the extrude side pieces and injection molded corners allow for the formation of any size picture frame by vulcanizing the appropriate pieces together, thus provides a significant cost savings.

What I claim as my invention is:

1. A fluid tight container, comprising:

first and second members, each of said first and second members having an edge portion;

a picture frame channel member, said pictire frame channel member when viewed in cross section having a bottom portion with inner and outer surfaces and two spaced side portions said outer surface of said bottom portion of said channel member being affixed to said edge portion of said first member in fluid tight cooperation; and a picture frame resilient gasket member having a central opening when viewed in cross section, said picture frame resilient gasket member being disposed in said picture frame channel member between said spaced portions, a first portion of said picture frame resilient gasket member being disposed on said inner surface of said bottom portion thus providing a first seal thereat, said edge portion of said second member being disposed against another portion of said picture frame resilient gasket member within said channel member thus providing a second seal thereat, said central opening being changeable in shape to accommodate gasket shape change as the result of the presence of said first and said second seals.

2. The combination as claimed in claim 1 wherein said first portion of said picture frame resilient gasket member is substantially planar to thereby provide a stable seal between said picture frame resilient gasket member and said inner surface of said bottom portion of said picture frame channel member.

3. The combination as claimed in claim 1 wherein said another portion of said picture frame resilient gasket member is substantially planar to thereby provide a relatively stable surface upon whcih said edge portion of said second member may be disposed.

4. The combination as claimed in claim 1 wherein said picture frame channel member has a longitudinal corner, the bottom portion of which is substantially seamless.

5. The combination as claimed in claim 1 wherein said picture frame resilient gasket member has an extruded side piece and an injection molded corner piece which are vulcanized together.

\* \* \* \* \*